June 27, 1950  J. J. DELANEY  2,512,792
REAR VISION REFLECTOR TUBE FOR MOTOR VEHICLES
Filed June 19, 1948
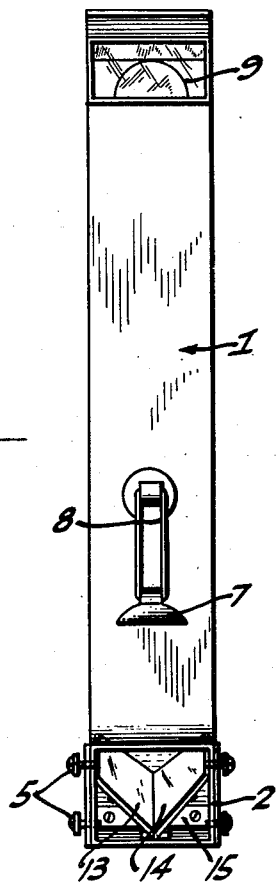
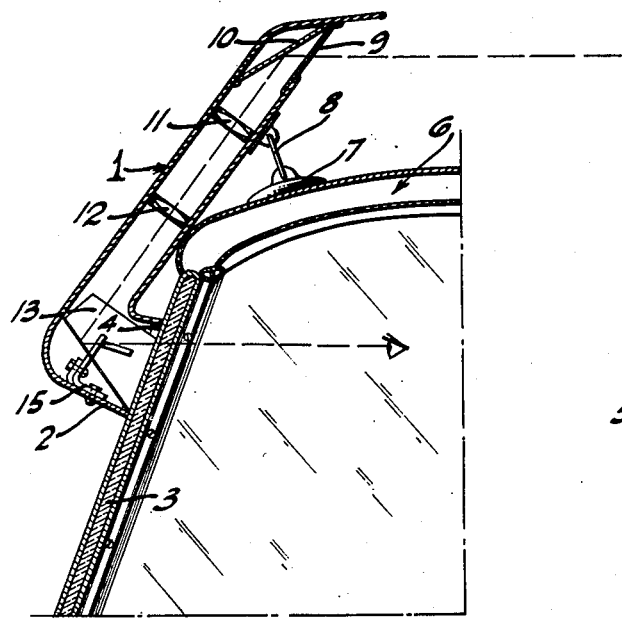
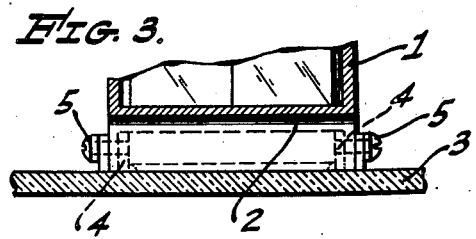
INVENTOR.
JOHN J. DELANEY.
BY
ATTORNEY.

Patented June 27, 1950

2,512,792

UNITED STATES PATENT OFFICE 2,512,792

REAR VISION REFLECTOR TUBE FOR MOTOR VEHICLES

John J. Delaney, Los Angeles, Calif.

Application June 19, 1948, Serial No. 34,117

4 Claims. (Cl. 88—70)

This invention relates to a rear vision reflector tube for motor vehicles, and generally of the periscope type, in which the periscope or housing is attached to the outside of the windshield, and within the easy vision of the driver of the vehicle.

An object of my invention is to provide a rear vision reflector of the character stated, in which a pair of mirrors are provided at the bottom of the tube, thereby positioning the image in its proper horizontal arrangement, that is, the image is correct as far as the left and right positioning is concerned, and relative to the driver of the vehicle.

Another object of my invention is to provide a rear vision reflector tube which has a wide horizontal angle of view.

Still another object is to provide a reflector tube of the character stated in which the image is magnified within the tube, and furthermore wherein the lens mounted in the tube has a shorter focal length relative to its diameter, thus providing a large horizontal field of vision.

Other objects, advantages and features of invention may appear from the accompanying drawing, the subjoined detailed description, and the appended claims.

In the drawing:

Figure 1 is a longitudinal sectional view of my reflector 2, in position on a vehicle.

Figure 2 is a rear elevation of the same.

Figure 3 is a sectional view showing the tube mounting.

Referring more particularly to the drawing, the numeral 1, indicates an elongated tube open at the top and bottom, the lower end being curved as shown at 2, so as to contact the windshield 3. The tube 1, is attached to the vehicle, and particularly to the outside of the windshield 3, in the following manner: A frame 4 is cemented to the outside of the windshield 3. This frame is flanged, and the lower curved portion 2, of the tube 1, is bolted or otherwise attached to the frame 4, by means of the screws or bolts 5. Thus the reflector tube is attached to the outside of the windshield, and within easy view of the driver of the vehicle.

The tube 1, projects upwardly above the cab or top 6, of the vehicle, and a suction cup 7, is secured to the top 6, and a link 8, is secured to the suction cup and to the reflector tube 1, substantially as shown. The suction cup 7, and link 8, thus act as an additional brace to hold the tube 1, in vertical position. The suction cup 7, can be easily adjusted or repositioned on the top 6, thus correcting the angle of the tube 1, so that the area to the rear of the vehicle can be viewed.

A window 9, encloses the upper end of the tube 1, preventing moisture and dirt from getting into the tube. An inclined mirror 10, is fixedly mounted in the tube 1, back of the window 9. Below the mirror 10, and also within the tube 1, I fixedly mount a lens 11. The focal length of this lens is short relative to its diameter. The purpose of this lens design being to provide a larger field of view and I have found that I can cover an angle of 90° or more horizontally, which is sufficiently wide to enable the driver to see on both sides of his vehicle. A second magnifying lens 12, is mounted below the lens 11, the purpose of this magnifying lens being to enlarge the image and this is accomplished in my construction without an eyepiece.

A pair of viewing mirrors 13, 14, are fixedly mounted in the lower end of the tube 1, and particularly in the curved portion 2. These mirrors form a V and the purpose of these mirrors is to reverse the image so that the object is viewed in its correct position relative to the driver of the vehicle, that is, an object on the left side will appear to be on the left, and similarly an object on the right side will appear to be on the right. The mirrors 13, 14, are mounted in a bracket or frame 15, and are thus held in fixed position, and at their correct angle. The operator looks directly into the viewing mirrors 13, 14, and observes one image, and not two, the reason being that the angle of the mirrors 13, 14, is such that the reflection from both mirrors blend into a single image. I have found that the mirrors 10, 13, and 14, should be constructed with what is known as first surfaces, the reason for this being that the mirrors are clearer and also are more effective in night driving.

Having described my invention, I claim:

1. A rear vision reflector tube for motor vehicles comprising an elongated tube, a mirror mounted in one end of said tube, and so arranged to reflect an image lengthwise of the tube, a lens mounted in said tube below the mirror and spaced therefrom, a magnifier lens mounted in said tube below the first named lens, a pair of viewing mirrors in the end of the tube opposite the first named mirror, the reflecting surfaces of the last named mirrors being arranged at an acute angle to each other, and mounting means securing said tube at its lower end to the windshield of the vehicle.

2. A rear vision reflector tube for motor vehicles comprising an elongated tube, a mirror mounted in one end of said tube, and so arranged to reflect an image lengthwise of the tube, a lens mounted in said tube below the mirror and spaced therefrom, a magnifier lens mounted in said tube below the first named lens, a pair of viewing mirrors in the end of the tube opposite the first named mirror, the reflecting surfaces of the last named mirrors being arranged at an acute angle to each other, a frame fixedly secured to the outside of the windshield of a vehicle, the lower end of said tube being fixedly attached to said frame, and a brace extending from said tube to the vehicle, said brace including a suction cup attachable to the vehicle, and a link secured to said suction cup and to the tube.

3. A rear vision reflector tube for motor vehicles comprising an elongated tube, open at both the top and the bottom, a window pane mounted in the tube and closing the upper end thereof, an angular mirror fixedly mounted in the tube and back of said window to reflect an image lengthwise of the tube, a lens mounted in said tube below the mirror, the focal length of said lens being shorter than its diameter, a magnifying lens in said tube below the first named lens, a pair of inclined viewing mirrors mounted in the lower end of said tube, the reflecting surfaces of said last named mirrors being arranged in a V shape so that an observer sees both surfaces, and mounting means securing the lower end of said tube to the outside of the windshield of the vehicle.

4. A rear vision reflector tube for motor vehicles comprising an elongated tube, open at both the top and the bottom, a window pane mounted in the tube and closing the upper end thereof, an angular mirror fixedly mounted in the tube and back of said window to reflect an image lengthwise of the tube, a lens mounted in said tube below the mirror, the focal length of said lens being shorter than its diameter, a magnifying lens in said tube below the first named lens, a pair of inclined viewing mirrors mounted in the lower end of said tube, the reflecting surfaces of said last named mirrors being arranged in a V shape so that an observer sees both surfaces, a frame cemented to the outside of the windshield of a vehicle, the lower end of said tube being bolted to said frame.

JOHN J. DELANEY.

REFERENCES CITED

The following references are of record in the file of this patent:

UNITED STATES PATENTS

| Number | Name | Date |
|---|---|---|
| 1,225,646 | Kessler | May 8, 1917 |
| 1,533,937 | Mogor | Apr. 14, 1925 |
| 1,635,011 | Sadler | July 5, 1927 |

FOREIGN PATENTS

| Number | Country | Date |
|---|---|---|
| 28,939 | Great Britain | Dec. 16, 1912 |
| 643,061 | France | Sept. 10, 1928 |
| 860,221 | France | Sept. 24, 1940 |